J. R. COOK.
ARRANGEMENT OF CONNECTIONS FOR DYNAMO ELECTRIC MACHINES.
APPLICATION FILED DEC. 15, 1916.
1,387,470.
Patented Aug. 16, 1921.
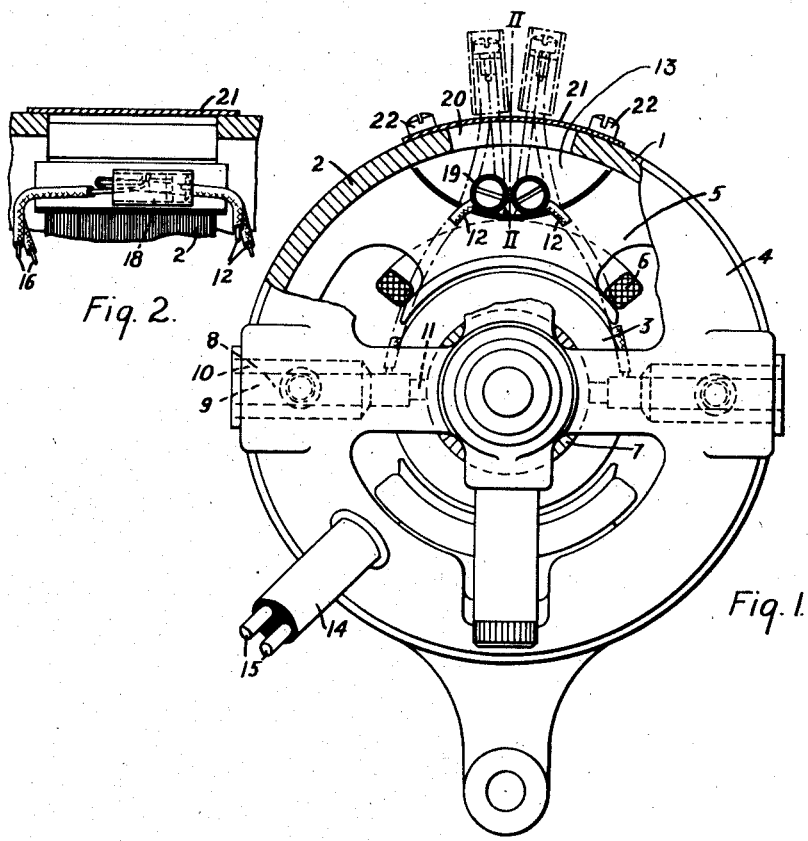
Fig. 2.
Fig. 1.
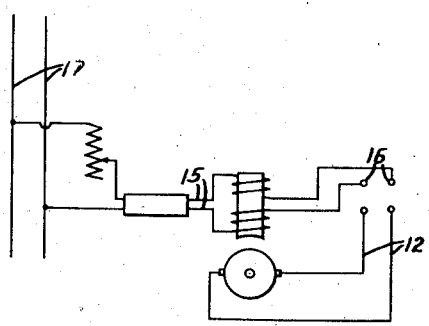
Fig. 3.
WITNESSES:
Fred. A. Lind.
O. W. Kennedy
INVENTOR
Joel R. Cook
BY
Wesley G. Carr
ATTORNEY

UNITED STATES PATENT OFFICE.

JOEL R. COOK, OF WILKINSBURG, PENNSYLVANIA, ASSIGNOR TO WESTINGHOUSE ELECTRIC & MANUFACTURING COMPANY, A CORPORATION OF PENNSYLVANIA.

ARRANGEMENT OF CONNECTIONS FOR DYNAMO-ELECTRIC MACHINES.

1,387,470.   Specification of Letters Patent.   Patented Aug. 16, 1921.

Application filed December 15, 1916. Serial No. 137,223.

*To all whom it may concern:*

Be it known that I, JOEL R. COOK, a citizen of the United States, and a resident of Wilkinsburg, in the county of Allegheny and State of Pennsylvania, have invented a new and useful Improvement in the Arrangement of Connections for Dynamo-Electric Machines, of which the following is a specification.

My invention relates to an arrangement of connections for dynamo-electric machines, and it has for its object to provide a novel arrangement of the conducting leads between the field-magnet and armature windings of an electric motor whereby the circuit relation between the respective windings may readily be altered, as, for example, when it is desired to reverse the direction of rotation of the motor.

Heretofore, it has been customary to bring the leads from the several windings to a point outside of the motor and to make such changes in the connections as are necessary by means of a suitable switch. According to my invention, I provide an arrangement in which the leads between the armature and field-magnet windings are normally located within the inclosing casing of the motor but in which the ends thereof are adapted to be readily removed through an opening provided in the casing whenever it is desired to change the circuit relation between the windings.

In the accompanying drawings, Figure 1 is a view, partially in section and partially in end elevation, of an electric motor embodying my invention; Fig. 2 is a fragmentary sectional view along the line II—II of Fig. 1, and Fig. 3 is a diagrammatic view showing the circuit connections of the motor of Fig. 1.

The motor comprises a substantially hollow cylindrical casing 1 within which is located an annular magnetizable core member 2 and an armature member 3 that is rotatably mounted in end bearing brackets 4 carried by the casing 1. The core member 2 is provided with polar projections 5 upon which are mounted field-magnet coils 6. The armature 3 is provided, at one end, with a commutator cylinder 7, and the front bearing bracket 4 is provided with oppositely disposed brush holders 8 located adjacent to the commutator cylinder 7. The brush holders 8 respectively comprise a hollow cylindrical member 9 of conducting material that is supported in the bracket 4 by an insulating bushing 10. Brushes 11 are located within the members 9, and conducting leads 12 are secured to the members 9 at points adjacent to the brushes 11. The leads 12 extend upwardly into a space 13 between the core member 2 and the casing 1, for a purpose to be hereinafter described. A multiple conductor cable 14 enters the end bracket 4 and comprises conductors 15 which are connected to one terminal of each of the field-magnet coils 6. The other terminals of the field-magnet coils 6 are connected to conducting leads 16 that extend from the rear of the motor upwardly into the space 13 and in substantially parallel relation to the brush leads 12. The circuit connections of the motor are more clearly shown in Fig. 3, wherein the conductors 15 are shown connected to the supply main 17 of a suitable direct-current or single-phase alternating-current source, the arrangement of the brush leads 12 and of the field-coil leads 16 being shown diagrammatically.

The portions of the leads 12 and 16 that are located in the space 13 are connected together, in pairs, by means of suitable cylindrical connectors 18 that are respectively surrounded by a tube 19 of insulating material. The connectors 18 form no part of the present invention and are fully shown and described in a copending patent application, Serial No. 146,475, filed Feb. 3, 1917, by G. H. Garcelon and assigned to the Westinghouse Electric & Manufacturing Company. The casing 1 is provided with an opening 20 that is located immediately above the connectors 18 and is normally closed by a name plate 21 secured to the casing by screws 22. The opening 20 is of sufficient length to allow the connectors 18 and a portion of the leads 12 and 16 to be withdrawn from the casing 1 through the opening, as indicated in dotted lines.

From the foregoing, it is apparent that, during the operation of the motor, the leads 12 and 16 are located entirely within the casing 1 so that there is no possibility of the circuit between the armature and field-magnet windings being interrupted, as would be the case if portions of the leads were located outside of the casing. If, however, it is found desirable to reverse the direction of rotation of the motor, it is only necessary to remove the name plate 21, withdraw the connectors 18 and change the relation of the leads 12 with respect to the field coil leads 16, after which the leads and connectors are returned to the space 13.

My arrangement of connections is also particularly advantageous when it is desired to test either the field-magnet coils or the armature winding for grounds or for other electrical defects, without removing any portion of the motor other than the name plate.

While I have shown my invention in a simple and preferred form it is not so limited but is susceptible of various minor changes and modifications within the scope of the appended claims.

I claim as my invention:

1. In a dynamo-electric machine, the combination with a magnetizable core member provided with a recess therein and an inclosing casing provided with an opening adjacent said recess, of electric conductors normally located within said recess and having portions thereof removable through said opening for altering the circuit connections of said machine.

2. In an electric motor, the combination with relatively rotatable magnetizable members the stator of which is provided with a recess in the periphery thereof, armature and field-magnet windings carried thereby, and an inclosing casing provided with an opening disposed in alinement with said recess, of leads from said field-magnet windings connected to leads from said armature windings by means of connectors disposed within said recess removable through said opening for altering the connections formed thereby.

3. In a dynamo-electric machine, the combination with an inclosing casing provided with an opening, a magnetizable core member disposed within said casing and having a portion thereof adjacent said opening cut away to form a recess, of a plurality of windings disposed within said dynamo-electric machine and having their ends disposed within the said recess and removable therefrom through the opening in said casing.

In testimony whereof, I have hereunto subscribed my name this 24th day of Nov., 1916.

JOEL R. COOK.